United States Patent [19]
Lace

[11] 4,350,176
[45] Sep. 21, 1982

[54] CHECK VALVE STRUCTURE

[76] Inventor: Donald A. Lace, 5041 Galway Cir., Huntington Beach, Calif. 92649

[21] Appl. No.: 178,791

[22] Filed: Aug. 18, 1980

[51] Int. Cl.³ .................. B08B 1/00; F16K 15/00; F16K 17/04

[52] U.S. Cl. .................. 137/242; 137/469; 137/516.25; 137/540; 137/554; 251/334; 251/DIG. 1

[58] Field of Search ............ 137/242, 469, 516.25, 137/540, 554; 251/333, 334, DIG. 1, 25

[56] References Cited

U.S. PATENT DOCUMENTS

| | | | |
|---|---|---|---|
| 2,542,390 | 2/1951 | Brown | 251/DIG. 1 |
| 2,657,897 | 11/1953 | Folmsbee | 251/333 |
| 2,666,614 | 1/1954 | Grove et al. | 251/DIG. 1 |
| 2,713,989 | 7/1955 | Bryant | 251/333 |
| 2,791,238 | 5/1957 | Bryant | 251/333 |
| 2,929,401 | 3/1960 | Cowan | 137/540 |
| 3,047,266 | 7/1962 | Ver Nooy | 251/DIG. 1 |
| 3,211,174 | 10/1965 | Weise et al. | 137/469 |
| 3,612,479 | 10/1971 | Smith, Jr. | 251/DIG. 1 |
| 3,770,008 | 11/1973 | Turney | 137/516.25 |
| 4,227,547 | 10/1980 | Cameron | 137/554 |
| 4,276,903 | 7/1981 | Spohr | 137/554 |

FOREIGN PATENT DOCUMENTS

| | | | |
|---|---|---|---|
| 717860 | 9/1965 | Canada | 251/DIG. 1 |
| 881136 | 6/1953 | Fed. Rep. of Germany | 251/25 |
| 1414838 | 11/1975 | United Kingdom | 251/25 |

Primary Examiner—George L. Walton
Attorney, Agent, or Firm—William C. Babcock

[57] ABSTRACT

A high lift check valve resistant to the flow of abrasive containing fluid therethrough, which valve may be transformed to also act as an excess fluid control valve.

17 Claims, 12 Drawing Figures

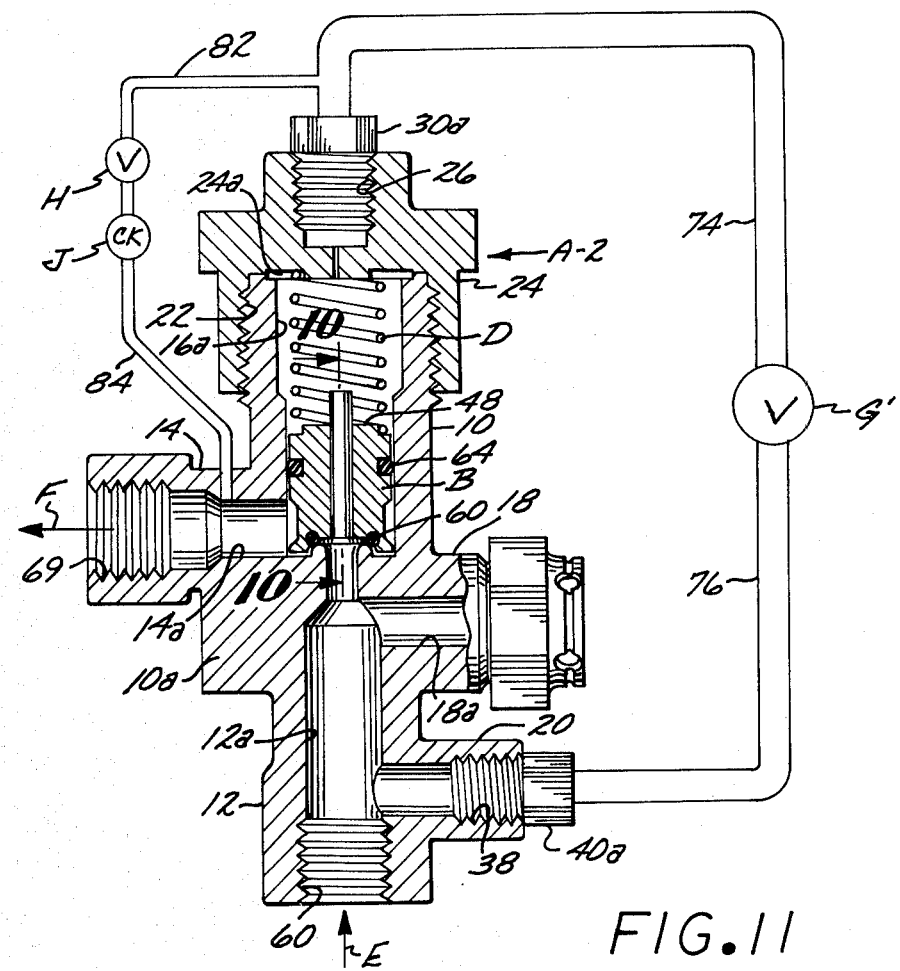
FIG. 9
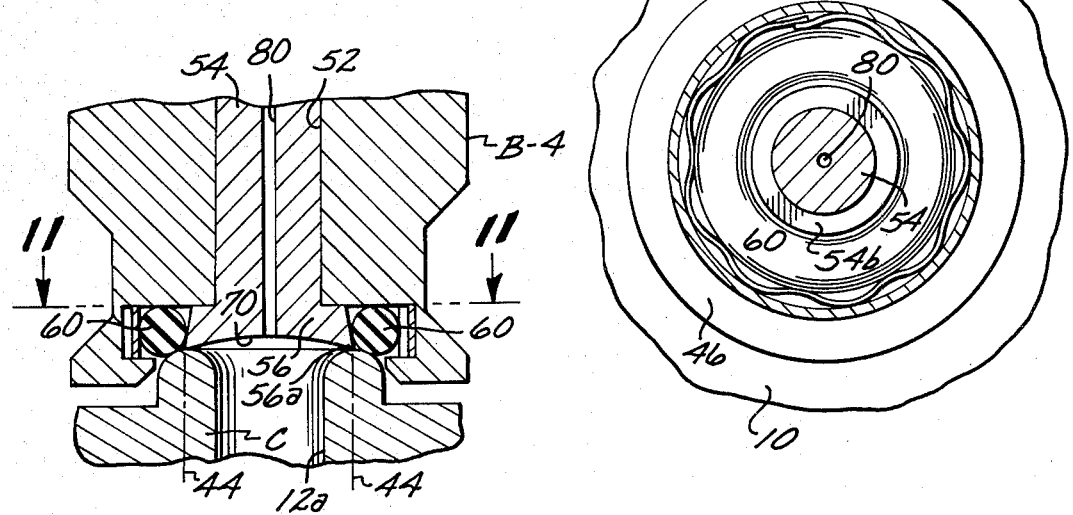
FIG. 10
FIG. 11

CHECK VALVE STRUCTURE

BACKGROUND OF THE INVENTION

1. Field of the Invention
Check valve structure.

2. Description of the Prior Art
In certain situations it is desirable to control the flow of abrasive containing fluid from a first zone to a second zone of lower pressure. Also, it is desirable in such situations to occasionally discharge excess fluid from the first to the second zone prior to the pressure in the first zone reaching a magnitude where the check valve would be actuated.

A major object of the present invention is to supply a high lift check valve in which the resilient sealing member thereof is protected from inadvertent displacement and abrasion due to the flow of high velocity fluid therethrough.

Another object of the invention is to supply a check valve that may be modified to permit the flow of excess fluid from a first zone to a second zone prior to the pressure in the first zone increasing to the extent that it actuates the check valve.

Yet another object of the invention is to furnish a spring-loaded check valve in which pressure of fluid in a first zone is utilized to maintain the check valve in a closed position until a manually operated valve associated with the check valve is at least partially opened.

A still further object of the invention is to supply a check valve in which the pressure of fluid in a second zone is utilized to maintain a resilient ring on a valve member in sealing engagement on a valve seat to seal against fluid in a first zone, with the pressure of fluid in the first zone being greater than that of fluid in the second zone.

SUMMARY OF THE INVENTION

A check valve having a high lift spring-loaded valve member that defines a hard, circular knife edge that pressure contacts a valve seat to sever any particled material deposited on the latter.

The check valve is of such structure as to discharge fluid at a predetermined pressure from a first to a second zone. The valve member of the check valve supports an elastomeric ring that tends to be forced into sealing contact with the valve seat by pressurized fluid in the second zone when the valve member is in a first position. Also, the check valve is of such structure that when the valve member moves from a first to a second position, the elastomeric ring is protected against being displaced from the valve member due to the flow of high velocity fluid through the check valve, and is also protected to a substantial degree from the abrasive action of the fluid.

By use of auxiliary valves the check valve may be used to control the flow of excess fluid from the first to the second zone, and also to maintain the check valve in a first closed position until at least one of the auxiliary valves is opened manually.

BRIEF DESCRIPTION OF THE DRAWINGS

FIG. 9 is a longitudinal cross-sectional view of the check valve shown in FIG. 1 that opens at a predetermined pressure only after two auxiliary valves are manipulated;

FIG. 10 is an enlarged fragmentary longitudinal cross-sectional view of a fourth alternate form of valve member; and FIG. 11 is a combined top plan view and transverse cross-sectional view of the valve member shown in FIG. 10, taken on the line 11—11 of the latter.

DESCRIPTION OF THE PREFERRED EMBODIMENTS

Figure 1:
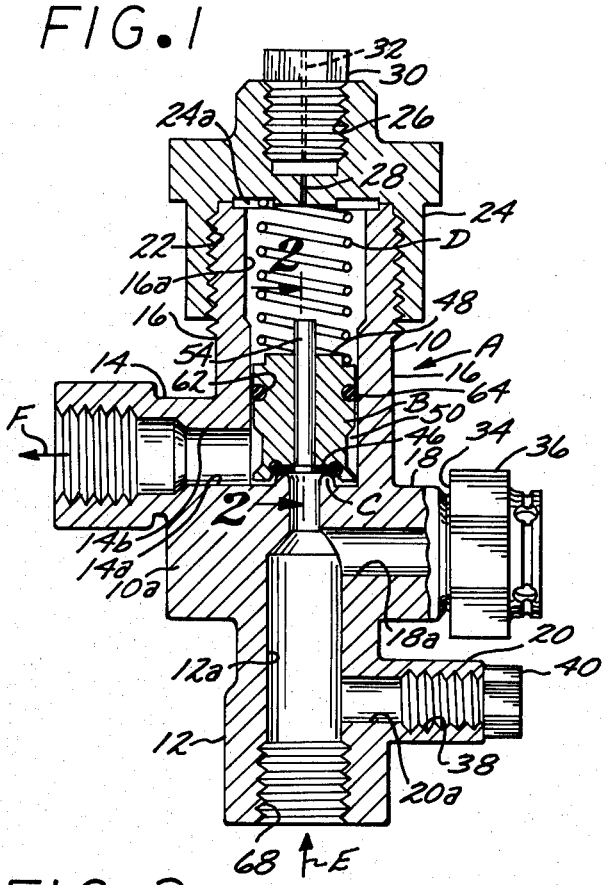
FIG. 1 is a longitudinal cross-sectional view of a high lift check valve that will sever or displace particled solid material deposited on the valve seat, with the check valve capable of being modified to one that will remain closed until an auxiliary valve is opened.

The check valve A as illustrated in FIG. 1 has a valve member B slidably disposed therein that is at all times urged into sealing contact with a circular valve seat C by a compressed helical spring D.

Check valve A includes a body 10 that has a central portion 10a from which first, second, third, fourth and fifth tubular legs 12, 14, 16, 18 and 20, respectively, extend outwardly. The first leg 11 has a first fluid passage 12a therein that terminates in the interior of the valve seat C. The first passage 12a serves as an inlet for pressurized fluid from a first zone E. Second leg 14 is preferably normally disposed relative to first leg 12. Second leg 14 has a second passage 14a therein through which fluid is discharged from valve A to a second zone F when the pressure on fluid in the first passage 12a is sufficient to move valve member B from sealing engagement with valve seat C.

The third leg 16 is coaxially aligned with first leg 12. The first leg 16 has an elongate confined space 16a therein in which valve member B is slidably and sealingly mounted. Third leg 16 has external threads 22 formed thereon that are engaged by an internally threaded cup-shaped bonnet 24.

Bonnet 24 has an internally threaded cavity 26 formed therein that is connected to a first vent passage 28 that communicates with confined space 16c. Cavity 26 is engaged by a first externally threaded plug 30 that has a second longitudinal vent passage 32 therein which is in communication with first vent passage 28 and the ambient atmosphere.

The fourth leg 18 has a passage 18a therein that communicates with first passage 12a. Fourth leg 18 has external threads 34 formed thereon that are engaged by an internally threaded blow-out cap 36, which cap includes a diaphram (not shown) that will fail at a predetermined pressure. The fifth leg 20 has a longitudinal passage 20a therein that terminates in outwardly disposed internal threads 38. Threads 38 are engaged by an externally threaded second plug 40.

Figure 4:
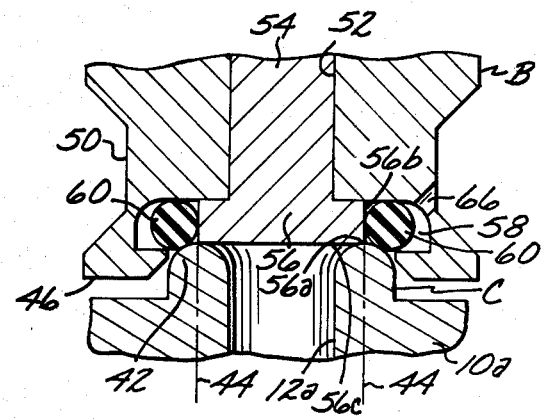
FIG. 4 is an enlarged fragmentary longitudinal cross-sectional view of the valve member shown in FIG. 1.

Valve seat C, as best seen in FIG. 4, is of circular shape, with the upper portion 42 thereof in transverse cross-section being of semi-circular configuration. The center of the transverse cross-section of the upper portion 42 shown in FIG. 4 is shown by two phantom lines 44.

Valve member B is formed from a rigid material, and is of generally cylindrical shape. Valve member B has first and second ends 46 and 48. A circumferential recess 50 is formed in the outer surface of valve member B adjacent the first end 46 thereof. Valve member B has a centered longitudinal bore 52 formed therein in which a rod 54 is press fit, with the rod on the lower end developing into a circular head 56 of rectangular transverse shape. The head 56 is formed from a material that is harder than that of any particled material that may be deposited on the upper portion 42 of the valve seat. Head 56 defines a circular knife edge 56a that contacts seat C on the centers 44.

First end 46 is defined by a circumferentially extending, inwardly projecting hook, as may be seen in FIG. 4, that cooperates with the side wall 56b of head 56 to provide a circular confined space 58. A first elastomeric sealing ring 60 is disposed in space 58, with the ring being of such internal diameter that it tends to grip side wall 56b and be forced into sealing engagement with surface 42 of valve seat C. The confined space 58 in transverse cross section is preferably at least twice that of sealing ring 60. A circumferential groove 62 is formed on the outer surface of valve member B intermediate recess 50 and second end 48, with the groove being engaged by a second elastomeric sealing member 64. First end 46 has a transverse passage 66 formed therein that communicates at all times with recess 50 and the outer portion of confined space 58. Head 56, as best seen in FIG. 4, includes a lower circular face 56c at its intersection with side wall 56b cooperating to define the circular knife edge 56a.

The first leg 12 has threads 68 formed on the free end thereof to permit the first leg to be connected by a fitting (not shown) to a source of fluid in the first zone E that varies in pressure. Second leg 14 likewise has threads 69 formed on the free end thereof that permit this leg to be connected by a fitting (not shown) to a zone F into which fluid from the check valve A will be discharged periodically. The spring D is compressed and is of helical shape, with one end of the spring being in abutting contact with the interior surface 24a of bonnet 24 and the other end in contact with second end 48 of valve member B.

When the pressure of fluid in first passage 12a exerts a force on the face 56c that is greater than the force exerted by spring D on the second end 48 of valve member B, the valve member B is forced upwardly in confined space 16a to permit fluid to flow from first passage 12a to second passage 14a.

From experience it has been found that if the valve member B is formed with the recess 50, the flow of fluid from first passage 12a to second passage 14a will result in a dynamic lift being imparted to valve member B sufficient to move first sealing ring 60 above the upper portion 14b of second passage 14a. When valve member B is so disposed, solid particles (not shown) entrained with the fluid flowing upwardly in first passage 12a impinge on face 56c and the first sealing ring 60 is subjected to a minimum of abrasive action. When valve member B moves upwardly in confined space 16a, air in the upper portion of this confined space discharges through vent passages 28 and 32 to the ambient atmosphere.

Air from the ambient atmosphere flows through vent passages 32 and 28 to the upper portion of confined space 16a when valve member B moves from an upwardly disposed position therein to the first sealing position illustrated in FIGS. 1 and 4. Rod 54 is held in a stationary position in bore 52 by being press fit therein or otherwise secured to valve member B.

When the pressure of fluid in first passage 12a drops to the extent that the force exerted on valve member B is less than that exerted by spring D, the valve member will move downwardly in confined space 16a to assume the first position illustrated in FIGS. 1 and 4. The knife edge 56a will sever or displace any solid particles from valve seat C when valve member B is in the last mentioned position.

When valve member B is in the first position shown in FIGS. 1 and 4, the resiliency of ring 60 will tend to maintain the sealing ring in sealing contact with the upper portion of valve seat C. As valve member B assumes the first position shown in FIGS. 1 and 4 pressurized fluid in second passage 14a will flow into recess 50, and therefrom through transverse passage 66 into the outer portion of the circumferential space 58. Pressurized fluid in the outer portion of circumferential space 58 will also tend to force ring 60 radially into sealing contact with valve seat C.

Figure 2:
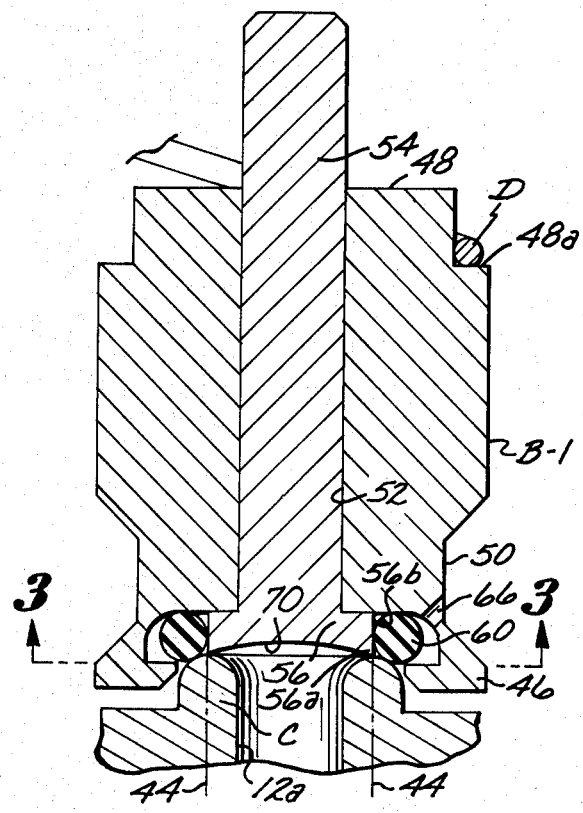
FIG. 2 is a fragmentary enlarged longitudinal cross-sectional view of a first alternate form of valve member.
Figure 3:
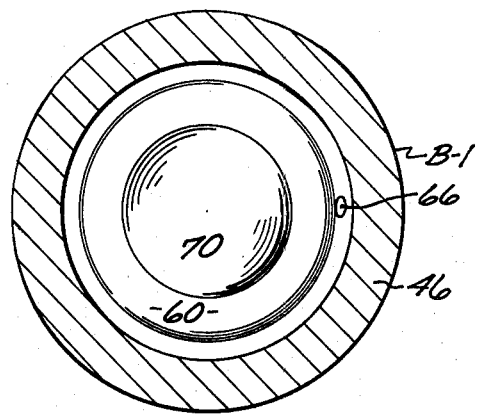
FIG. 3 is a combined bottom plan view and transverse cross-sectional view of the valve member shown in FIG. 2, taken on the line 3—3 of the latter.

The first alternate form B-1 of the valve member shown in FIG. 2 is identical with valve member B, other than valve member B-1 has a concave face 70 rather than a flat face 56c. When pressurized fluid impinges on face 70, the fluid is deflected outwardly and slightly downwardly to impart maximum lift to valve member B.

Figure 5:
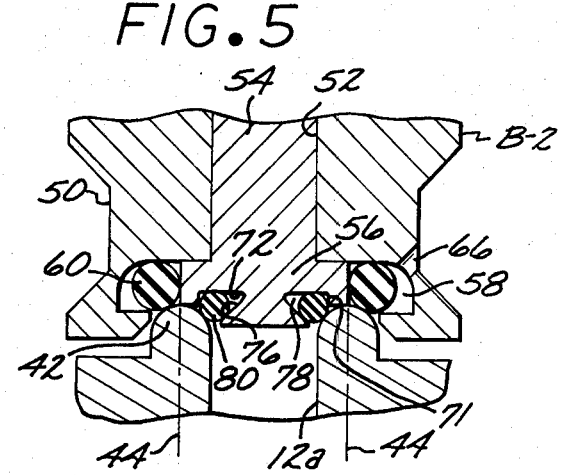
FIG. 5 is an enlarged fragmentary longitudinal cross-sectional view of a second alternate form of valve member.

The second alternate form of valve member B-2 shown in FIG. 5 is similar to valve member B and differs therefrom only in the head 56 being modified to have a lower portion defined by a ring-shaped face 72, outer circular wall 71 and inner tapered circular wall 76. Face 72 and walls 71 and 76 cooperate to define a confined space 78 in which a second elastomeric sealing ring 80 is disposed, which ring 80 when valve member B-2 is in the first position shown in FIG. 5 is in pressure sealing engagement with valve seat C, and augments the seal provided by first ring 60.

Figure 7:
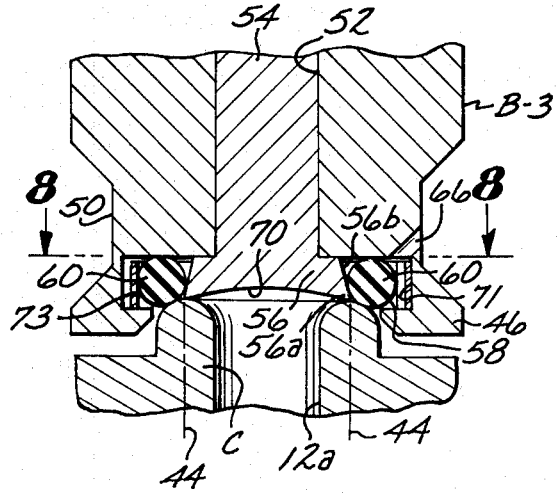
FIG. 7 is an enlarged fragmentary longitudinal cross-sectional view of a third alternate form of valve member.
Figure 8:
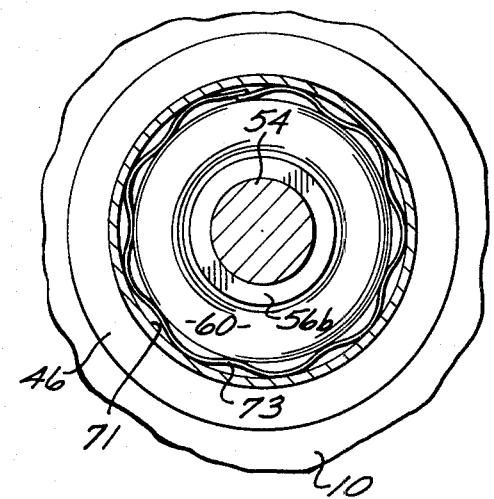
FIG. 8 is a combined transverse cross-sectional view and top plan view of the valve member shown in FIG. 7, taken on the line 8—8 of the latter.

A third alternate form of valve member B-3 is shown in FIGS. 7 and 8 that is identical in structure with the second alternate form B-1, other than the third alternate form includes a circular spring 73 of undulating configuration disposed in circumferential space 58. Spring 73 is deformed and tends at all times to exert an inwardly directed force on first sealing ring 60. This inwardly directed force assures that first sealing ring 60 will be in sealing contact with valve seat C when valve member B-3 is in the first position shown in FIGS. 7 and 8.

Figure 6:
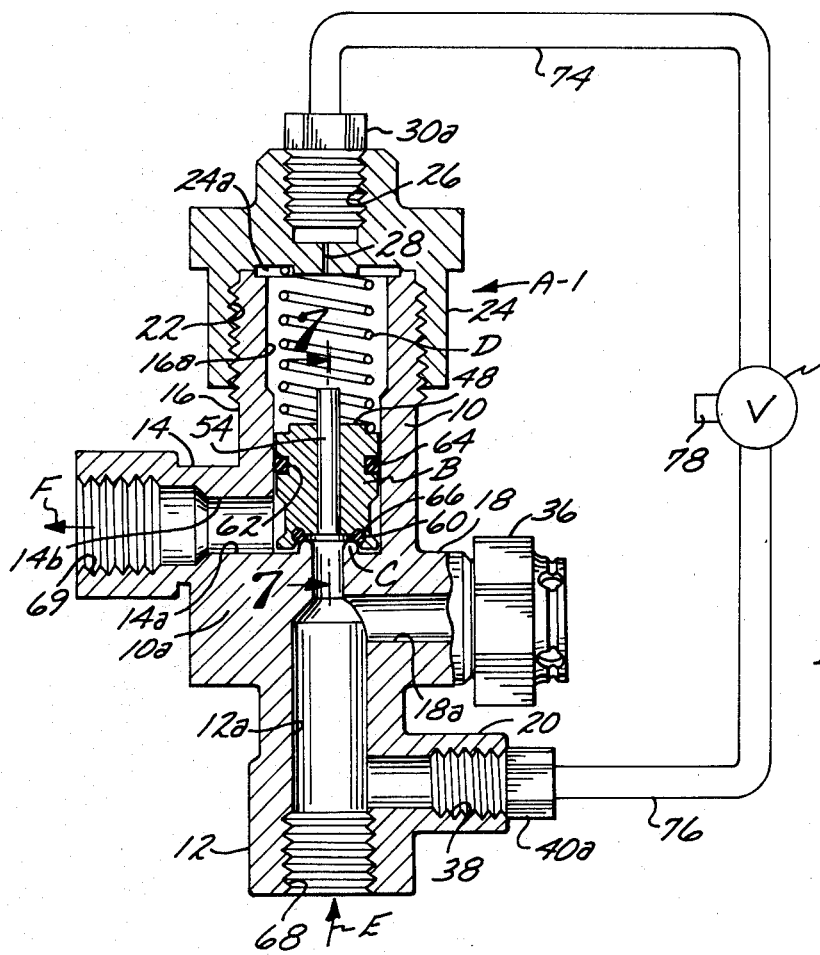
FIG. 6 is a longitudinal cross-sectional view of the check valve shown in FIG. 1 modified to open only after an auxiliary valve is manipulated.

The check valve A is shown in FIG. 6 as having been modified to provide a check valve A-1 that will have the valve member B move from the first closed position to the second open position only after an auxiliary valve G is manually manipulated.

In modifying the check valve A the first and second plugs 30 and 40 are unscrewed therefrom and replaced by first and second fittings 30a and 40a that are connected to first and second conduits 74 and 76. The first and second conduits extend to and are connected to the valve G.

Valve G is of the three-way type and has a third conduit 78 that extends therefrom and is in communication with the ambient atmosphere. Valve G, when in a first position, obstructs communication between first, second and third conduits 74, 76 and 78. The valve G when in a second position establishes communication between first and second conduits 74 and 76. The area of the first end 46 within the confines of first sealing ring 60 is substantially less than the second end 48.

When valve member B is in the first position shown in FIG. 6 and valve G is in the second position fluid flows from first zone E through second conduit 76, valve G and first conduit 74 into confined space 16a above valve member B. This fluid in confined space 16a above valve member B maintains the valve member in the first position shown in FIG. 6.

When it is desired to place the modified valve A-1 in a condition where the valve member B will move to a second position when fluid in first zone E exceeds a predetermined pressure, the valve G is moved to a third position where communication is established between first conduit 74 and third conduit 78. The pressure in confined space 16a above valve member B is now reduced to that of the ambient atmosphere, and the only force that maintains valve member B in the first closed position is that exerted by the compressed spring D. The wall 56b in FIG. 7 of valve member 56 is shown as tapering downwardly and inwardly.

A fourth form B-4 of valve member is shown in FIGS. 10 and 11 that is identical with the third form B-3, other than that the head 56 and rod 54 have a longitudinal passage defined therein.

Due to the first end 48 of the fourth form of valve member B-4 being of greater area than the face 70, this fluid in confined space 16a will maintain the fourth form of valve member in the first closed position irrespective of the fluid pressure in first zone E. A second modified form A-2 of valve A is shown in FIG. 9. Second modified form A-2 of the valve permits fluid to be transferred from first zone E to second zone F when the fluid in the first zone is not at a sufficient pressure to move the fourth form B-4 of the valve member from the first to the second position.

In the second modified form A-2 of the valve, the second conduit 76 has a third conduit 82 extending therefrom to a second auxiliary valve H, which valve by the fourth conduit 84 is connected to second passage 14a. A check valve J is interposed in conduit 84 downstream from valve H. The three-way valve G in second form A-2 is replaced by a two-way valve G' as shown in FIG. 9.

The passage 80 is of small transverse cross-section and allows fluid from first zone E to slowly bleed therethrough to the confined space 16a above form B-4 of the valve member.

Valve G' when in a first position obstructs communication between first and second conduits 74 and 76, and valve H when in a second position likewise obstructs communication between third and fourth conduits 82 and 84. When it is desired to discharge surplus fluid from the first zone E to second zone F, valves G' and H are placed in second positions where they establish communication between first and second conduits 74 and 76 and third and fourth conduits 82 and 84.

The by-pass of fluid from first zone E to second zone F is terminated by closing valve G'. If it is desired to have the second modified form A-2 operate in the same manner as check valve A, the second auxiliary valve H is placed in the second open position. Second auxiliary valve H when in the second open position allows fluid from the first zone E that has bled through the passage 80 into confined space 16a to flow therefrom through third and fourth conduits 82 and 84 to second zone F.

A check valve J is provided in fourth conduit 84 to prevent pressurized fluid from second zone F flowing back to confined space 16a to prevent the second modified form A-2 of the valve operating in the same manner as check valve A when second auxilary valve H is in a second open position.

In the check valves A and A-1 the body 10, and valve member B may be formed from an electrical insulating material such as a polymerized resin or the like. When it is desired to have positive knowledge or warning that the check valves A and A-1 are in closed positions, the rod 54 and head 56 may be formed from an electrical conducting material, as is an upper portion 42a of valve seat 42 as shown in FIG. 12 to form a part of an electrical circuit K.

The electrical circuit K includes an electrical conductor 100 connected to valve seat portion 42a and that extends to a one terminal of a source of electric power 102, and the other terminal of the source of electric power having an electrical conductor 104 extending therefrom to a blade 106 of an electric switch 108 that has a contact 110. An electrical conductor 112 extends from contact 110 to one terminal of an incandescent electric light bulb 114, with the other terminal of the bulb having an electric conductor extending therefrom to rod 116.

When switch 108 is closed and either the check valve A or A-1 is in a closed position, the circuit K will be completed to illuminate bulb 114 and visually indicate the check valves are in the closed position.

Figure 12:
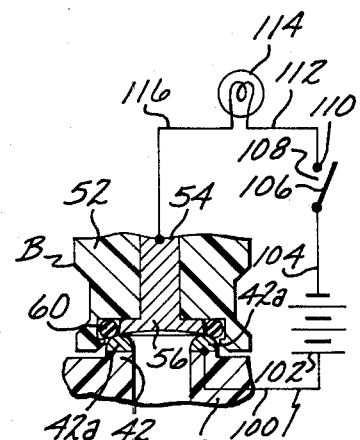
FIG. 12 is a check valve structure with position indicating light.

The electric circuit K shown in FIG. 12 is merely illustrative of the concept of providing visual means to indicate that the check valves of the present invention are in closed positions, thus, the circuit K may be used equally well with any structure of the check valves A and A-1 in which the head 56 and valve seat portion 42a are electrically isolated except when the valves are in the closed positions.

The use and operation of the invention has been described previously in detail and need not be repeated.

I claim:

1. A self cleaning check valve that permits fluid that may have solid particles entrained therewith to flow from a first zone to a second zone when the pressure on fluid in said first zone exceeds a predetermined magnitude, said check valve including:
   a. a valve body that has first and second passages and an elongate confined space defined therein that communicate with one another, said first passage and confined space axially aligned, a circular valve seat of semi-circular transverse cross section inside said body in which said first passage terminates, and said first and second passages in communication with said first and second zones;
   b. (a) an elongate cylindrical valve member slidably movable in said confined space, said valve member having first and second ends, said first end partially defined by a circular rib of hook shape transverse cross section, said rib having a transverse passage therein, and a circumferential recess on the exterior of said valve member that communicates with said passage;

c. a head supported from said first end and situated within and radially spaced from said rib, said head defined by a generally cylindrical sidewall and an end face that intersect to provide a circular knife edge of such diameter that said knife edge is centered on said valve seat when said valve member is in a first position, said head formed from a rigid material harder than said particles, and said knife edge either severing or displacing those of said particles deposited on said valve seat when said valve member is in said first position;

d. deformed spring means in said confined space that maintain said valve member in said first position until the pressure of fluid of said predetermined magnitude in said first zone exerts a force on said face of said head that is greater than the force exerted by said spring means on said valve member; and e. a first resilient sealing ring that grips said side wall and is disposed in a circumferential space defined on said first end of said valve member between said rib and side wall of said head, said valve member due to said recess having a dynamic lift imparted thereto that disposed said valve member at a second position substantially within said confined space where said sealing ring is exposed to a minimum abrasive action by said particles when said fluid flows at high velocity through said first passage, valve seat and second passage upon said fluid in said first zone exceeding said predetermined magnitude in pressure, with said valve member being moved by said spring means from said second to said first position when said pressure of said fluid in said first zone falls below said predetermined magnitude, with pressurized fluid in said second zone after said valve member returns to said first position flowing into said recess and through said passage into said circumferential space to exert an inwardly directed pressure on said first sealing ring to increase the force that urges said first sealing ring into sealing contact with said valve seat.

2. A check valve as defined in claim 1 in which said spring means is a compressed helical spring that has one end in abutting contact with said second end of said valve member and the opposite end in abutting contact with an interior surface of said valve body.

3. A check valve as defined in claim 2 which includes passage means that at all times vent the portion of said confined space adjacent said second end of said valve member to the ambient atmosphere.

4. A check valve as defined in claim 1 in which said end face is concave to impart additional lift to said valve member as said fluid flowing through said first passage and valve seat impinges thereon prior to flowing to said second zone through said second passage.

5. A check valve as defined in claim 1 which in addition includes:
 f. a second resilient sealing ring; and
 g. first means on said head that are encircled and gripped by said second sealing ring, with said second sealing ring being in pressure sealing contact with said valve seat when said valve member is in said first position.

6. A check valve as defined in claim 5 in which said side wall tapers outwardly towards said first means.

7. A check valve as defined in claim 6 in which said first means is an extension of said valve member that is circular and generally hook shape in transverse cross section, with at least a portion of said extension disposed under said resilient ring.

8. A check valve as defined in claim 7 in which said valve member has a circumferential recess defined on the external surface thereof adjacent said first end, with said resilient ring and said extension so related in size as to define an annulus space therebetween, and said extension having a passage therein that at all times maintains communication between said annular space and said recess.

9. A check valve as defined in claim 8 which in addition includes,
 e. a second resilient ring of smaller diameter than said first resilient ring; and
 f. second means supporting said second resilient ring from said head for said second ring to seal with said valve seat when the latter is contacted by said knife edge.

10. A check valve as defined in claim 1 which in addition includes:
 f. circular spring means that encircle said first resilient sealing ring and urge said first resilient sealing ring into sealing contact with said valve seat when said valve means is in said first position.

11. A check valve as defined in claim 1 in which said head and valve member have a longitudinal passage of small diameter through which fluid from said first zone may bleed into the portion of said confined space adjacent said second end of said valve member, said second end of said valve member being of greater area than said end face of said head, and the force exerted by fluid in said confined space being greater than the force exerted by fluid from said first zone on said end face of said head whereupon said valve member remains in said first position when said pressure of said fluid in said first zone exceeds said predetermined magnitude, said check valve in addition including:
 f. a second sealing ring mounted on said valve member that slidably and sealingly engages the surface of said valve body that defines said confined space; and
 g. valve means for venting the portion of said confined space adjacent said second end of said valve member to the atmosphere to permit said valve member to move from said first to said second position when said fluid in said first zone increases in pressure to above said predetermined magnitude.

12. A check valve as defined in claim 1 in which the area of said second end of said valve member is greater than the area of said end face of said head and that in addition includes:
 f. first and second conduits connected to the portion of said confined space adjacent said second end of said valve member and to said first passage; and
 g. a manually operated three-way valve connected to said first and second conduits, said valve when in a first position obstructing communication between said first and second conduits, said valve when in a second position effecting communication between said first and second conduit for fluid to flow from said first zone into said confined space adjacent said second end of said valve member to hold said valve member in a first position when said pressure of said fluid in said first zone rises above said predetermined magnitude, and said valve when in a third position establishing communication between said confined space adjacent said second end of said valve member and the ambient atmosphere to allow said valve member to move to said second position when said pressure in said first zone rises above said predetermined magnitude.

13. A check valve as defined in claim 1 in which the area of said second end of said valve member is greater than the area of said end face of said head and that in addition includes:
 f. first and second conduits connected to the portion of said confined space adjacent said second end of said valve member and to said first passage;
 g. a first two-way valve connected to said first and second conduits, said first valve when in a first position obstructing communication between said first and second conduits, said first valve when in a second position effecting communication between said first and second conduits for fluid from said first zone to flow into the portion of said confined space adjacent said second end of said valve member to maintain said valve member in a first position when the pressure of said fluid in said first zone rises above said predetermined magnitude;
 h. third and fourth conduits in communication with said second conduit and said second passage;
 i. a second two-way valve connected to said third and fourth conduits, said second valve when in a first position obstructing communication between said third and fourth conduits, and said second valve when in a second position effecting communication between said third and fourth conduits, with said first and second valves when each is in a second position permitting surplus pressurized fluid to be discharged from said first to said second zone even through the pressure of fluid in said first zone is below said predetermined magnitude, and said second valve when placed in said second position permitting fluid admitted into the portion of said confined space adjacent said second end of said valve member by use of said first valve, and after said first valve has been placed in said first position, to discharge to said second zone to permit said valve member to move to said second position when the pressure of fluid in said first zone exceeds said predetermined magnitude.

14. A check valve as defined in claim 13 which in addition includes:
 i. a check valve in said fourth conduit that prevents pressurized fluid from said second zone flowing through said second valve when it is in a second position and through said third conduit to said confined space to prevent said valve member from moving from said first to said second position when fluid in said first zone is at a pressure greater than said predetermined magnitude.

15. A check valve as defined in claim 1 in which said head end face is concave.

16. A check valve as defined in claim 1 in which a passage of small diameter extends longitudinally through said head and said valve member.

17. A check valve as defined in claim 1 in which said valve member and at least the portion of said valve seat that may be engaged by said knife edge are electrically isolated from one another except when in pressure contact, and said check valve in addition including;
 f. an electrical circuit of which said valve head and portion of said valve head form a part, said electric circuit including a source of electric power and electrically actuated warning means, said electric circuit becoming closed to electrically energize said warning means which said head and portion of said valve seat are in pressure contact as occurs when said check valve is in a closed position.

* * * * *